US012243362B2

(12) United States Patent
Komuro et al.

(10) Patent No.: US 12,243,362 B2
(45) Date of Patent: Mar. 4, 2025

(54) MALFUNCTION DIAGNOSING SYSTEM

(71) Applicant: SUBARU CORPORATION, Tokyo (JP)

(72) Inventors: Masaki Komuro, Tokyo (JP); Hiroyuki Suzuki, Tokyo (JP); Yosuke Ohtomo, Tokyo (JP); Takumi Hoshi, Tokyo (JP); Takashi Kono, Tokyo (JP); Kazuki Makino, Tokyo (JP); Masakazu Yoshino, Tokyo (JP); Itaru Seta, Tokyo (JP); Shinya Sagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 347 days.

(21) Appl. No.: 17/407,724

(22) Filed: Aug. 20, 2021

(65) Prior Publication Data

US 2022/0076509 A1 Mar. 10, 2022

(30) Foreign Application Priority Data

Sep. 8, 2020 (JP) ................................ 2020-150675

(51) Int. Cl.
*G07C 5/08* (2006.01)

(52) U.S. Cl.
CPC ......... *G07C 5/0816* (2013.01); *G07C 5/0808* (2013.01)

(58) Field of Classification Search
CPC .... G07C 5/0816; G07C 5/0808; G07C 5/008; G06F 30/15; G01M 17/007; G06Q 10/20
See application file for complete search history.

(56) References Cited

U.S. PATENT DOCUMENTS

2007/0029957 A1 2/2007 Krimmer
2011/0031361 A1 2/2011 Garvin
(Continued)

FOREIGN PATENT DOCUMENTS

JP 2006-349429 A 12/2006
JP 2008-001233 A 1/2008
(Continued)

OTHER PUBLICATIONS

Japanese Office Action issued in corresponding JP Application No. 2020-150675, dated May 7, 2024, related to U.S. Appl. No. 17/407,724.

*Primary Examiner* — Michael V Kerrigan
(74) *Attorney, Agent, or Firm* — TROUTMAN PEPPER LOCKE LLP

(57) ABSTRACT

A malfunction diagnosing system includes a data acquirer, an appropriate range setter, and a malfunction determiner. The data acquirer is configured to acquire traveling environment data and actual traveling result data in association with each other for a target vehicle to be subjected to malfunction diagnosis. The traveling environment data includes at least driving operation data indicating a driving operation. The actual traveling result data indicates an actual traveling result based on the traveling environment data. The appropriate range setter is configured to derive an appropriate range of actual traveling results based on the traveling environment data for vehicles the models of which are identical to a model of the target vehicle. The malfunction determiner is configured to determine whether the target vehicle has a malfunction by determining whether the actual traveling result data falls within the appropriate range.

8 Claims, 7 Drawing Sheets

(56) References Cited

U.S. PATENT DOCUMENTS

| | | | | |
|---|---|---|---|---|
| 2011/0313616 | A1* | 12/2011 | Tsuchikiri | B60W 50/0205 701/33.7 |
| 2019/0153291 | A1 | 5/2019 | Al-Yami et al. | |
| 2019/0340848 | A1* | 11/2019 | Nakamura | G07C 5/008 |
| 2022/0163582 | A1* | 5/2022 | Kusumoto | G01R 1/088 |

FOREIGN PATENT DOCUMENTS

| | | | |
|---|---|---|---|
| JP | 2010-137644 | A | 6/2010 |
| JP | 2015-158421 | A | 9/2015 |
| JP | 2017-216580 | A | 12/2017 |
| JP | 2019-153291 | A | 9/2019 |
| JP | 2019-206193 | A | 12/2019 |

* cited by examiner

MALFUNCTION DIAGNOSING SYSTEM

CROSS-REFERENCE TO RELATED APPLICATION

The present application claims priority from Japanese Patent Application No. 2020-150675 filed on Sep. 8, 2020, the entire contents of which are hereby incorporated by reference.

BACKGROUND

The disclosure relates to a malfunction diagnosing system.

For example, Japanese Unexamined Patent Application Publication No. 2006-349429 discloses a malfunction diagnosing device that diagnoses a malfunction occurring in a vehicle.

SUMMARY

An aspect of the disclosure provides a malfunction diagnosing system including a data acquirer, an appropriate range setter, and a malfunction determiner. The data acquirer is configured to acquire traveling environment data and actual traveling result data in association with each other for a target vehicle to be subjected to malfunction diagnosis. The traveling environment data includes at least driving operation data indicating a driving operation. The actual traveling result data indicates an actual traveling result based on the traveling environment data. The appropriate range setter is configured to derive an appropriate range of actual traveling results based on the traveling environment data for vehicles the models of which are identical to a model of the target vehicle. The malfunction determiner is configured to determine whether the target vehicle has a malfunction by determining whether the actual traveling result data falls within the appropriate range.

An aspect of the disclosure provides a malfunction diagnosing system including circuitry. The circuitry is configured to acquire traveling environment data and actual traveling result data in association with each other for a target vehicle to be subjected to malfunction diagnosis. The traveling environment data includes at least driving operation data indicating a driving operation. The actual traveling result data indicates an actual traveling result based on the traveling environment data. The circuitry is configured to derive an appropriate range of actual traveling results based on the traveling environment data for vehicles the models of which are identical to a model of the target vehicle. The circuitry is configured to determine whether the target vehicle has a malfunction by determining whether the actual traveling result data falls within the appropriate range.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 2A to FIG. 2C are diagrams illustrating an appropriate range of actual traveling result data and determination as to whether a malfunction occurs, in which FIG. 2A illustrates an example of pieces of actual traveling result data of other vehicles, FIG. 2B illustrates an example of the appropriate range, and FIG. 2C illustrates an example of actual traveling result data of a target vehicle;

FIG. 6A to FIG. 6D are diagrams illustrating relationships between the vehicle simulation model and a malfunction of a vehicle, in which FIG. 6A and FIG. 6B illustrate a relationship between actual traveling result data and virtual traveling result data when the target vehicle has no malfunction, and FIG. 6C and FIG. 6D illustrate a relationship between the actual traveling result data and the virtual traveling result data when the target vehicle has a malfunction;

FIG. 7A to FIG. 7D are diagrams illustrating relationships between the vehicle simulation model and identification of a malfunctioning part, in which FIG. 7A and FIG. 7B illustrate an example of a process of identifying the malfunctioning part, and FIG. 7C and FIG. 7D illustrate an example in which the malfunctioning part is identified.

DETAILED DESCRIPTION

Vehicles have manufacturing variations. Therefore, some vehicles may undergo erroneous diagnosis of malfunctions.

It is desirable to provide a malfunction diagnosing system having an improved accuracy of diagnosis of malfunctions of vehicles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
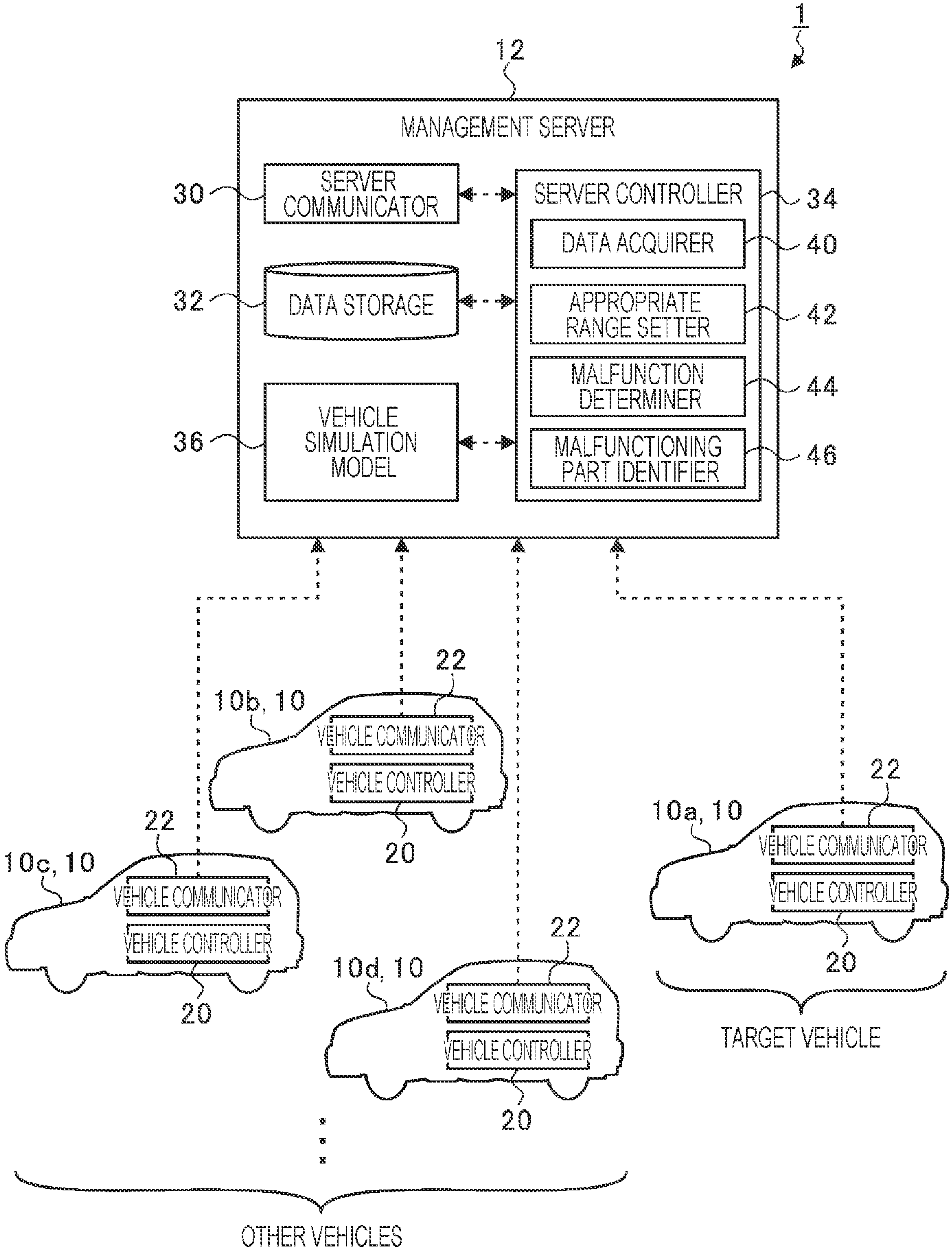
FIG. 1 is a schematic diagram illustrating the configuration of a malfunction diagnosing system according to an embodiment.

FIG. 1 is a schematic diagram illustrating the configuration of a malfunction diagnosing system 1 according to this embodiment. The malfunction diagnosing system 1 includes a plurality of vehicles 10 and a management server 12. Each vehicle 10 may be any one of an engine vehicle, an electric vehicle, and a hybrid vehicle. FIG. 1 illustrates four vehicles 10*a*, 10*b*, 10*c*, and 10*d* as the vehicles 10. The vehicles 10*a*, 10*b*, 10*c*, and 10*d* may be referred to collectively as "vehicles 10". The number of vehicles 10 is not limited to four, and may be plural such as two, three, five, or more.

The malfunction diagnosing system 1 diagnoses whether a predetermined vehicle 10 out of the plurality of vehicles 10 has a malfunction. The vehicle 10 that undergoes the malfunction diagnosis may be referred to as "target vehicle". Vehicles different from the target vehicle, that is, vehicles that do not undergo the malfunction diagnosis may be referred to simply as "other vehicles". For example, in FIG. 1, the target vehicle is the vehicle 10*a*, and the other vehicles are the vehicles 10*b*, 10*c*, and 10*d*. The target vehicle is not limited to the vehicle 10*a*, and any vehicle may be selected from among the plurality of vehicles 10.

Each vehicle 10 includes a vehicle controller 20 and a vehicle communicator 22. The vehicle controller 20 is a semiconductor integrated circuit including a central processing unit, a ROM storing programs and the like, and a RAM serving as a working area.

The vehicle controller 20 acquires data indicating driving operations such as acceleration, deceleration, and steering of the vehicle via an accelerator sensor, a brake sensor, a shift sensor, and a steering angle sensor (which are not illustrated). The vehicle controller 20 acquires data indicating an external environment via various detectors such as a radar, an infrared sensor, a camera, and a temperature sensor. The external environment may include various elements that affect driving of the vehicle, such as a gradient, a road condition, weather, a wind direction, a wind speed, an outside air temperature, and an atmospheric pressure.

Data indicating the driving operations may be referred to as "driving operation data". Data indicating the external environment may be referred to as "external environment data". The driving operation data and the external environment data may be referred to collectively as "traveling environment data". The traveling environment data includes at least the driving operation data, and the external environment data may be omitted therefrom.

Based on the traveling environment data, the vehicle controller 20 controls the overall operation of the vehicle 10, such as driving, braking, and steering. The vehicle controller 20 can acquire data indicating an actual traveling result via various sensors such as a rotation speed sensor (not illustrated). The data indicating the actual traveling result may be referred to as "actual traveling result data". Examples of the actual traveling result data include rotation speeds of wheels, a speed of the vehicle 10, and an acceleration of the vehicle 10. Examples of the actual traveling result data also include an intermediate output result of the vehicle 10, such as an engine speed. The vehicle controller 20 associates the traveling environment data with the actual traveling result data acquired based on the traveling environment data.

The vehicle communicator 22 is wirelessly communicable with an external communication device of, for example, the management server 12. The vehicle controller 20 periodically transmits the traveling environment data, the actual traveling result data, and vehicle identification data to the management server 12 via the vehicle communicator 22. The vehicle identification data is data for identifying the vehicle. The vehicle identification data includes vehicle model data indicating a model of the vehicle.

For example, the management server 12 is installed by an administrator of the malfunction diagnosing system 1. The management server 12 includes a server communicator 30, a data storage 32, a server controller 34, and a vehicle simulation model 36. For example, the server communicator 30 is wirelessly communicable with each of the vehicles 10. The data storage 32 is a non-volatile storage element.

The server controller 34 is a semiconductor integrated circuit including a central processing unit, a ROM storing programs and the like, and a RAM serving as a working area. The server controller 34 executes the programs to function as a data acquirer 40, an appropriate range setter 42, a malfunction determiner 44, and a malfunctioning part identifier 46.

The data acquirer 40 acquires traveling environment data, actual traveling result data, and vehicle identification data in association with each other from the vehicle 10 via the server communicator 30. The data acquirer 40 acquires the traveling environment data and the actual traveling result data based on the traveling environment data in association with each other for all the vehicles 10 including the target vehicle. The data acquirer 40 stores the acquired traveling environment data, the acquired actual traveling result data, and the acquired vehicle identification data in the data storage 32.

The appropriate range setter 42 derives an appropriate range of actual traveling result data in relation to traveling environment data based on pieces of traveling environment data and actual traveling result data of one or more vehicles. The appropriate range setter 42 updates the appropriate range every time traveling environment data and actual traveling result data are acquired. The appropriate range of the actual traveling result data serves as a reference of determination as to whether the target vehicle has a malfunction. The appropriate range is described later in detail.

The malfunction determiner 44 determines whether the target vehicle has a malfunction by determining whether the actual traveling result data of the target vehicle falls within the appropriate range. The malfunction determiner 44 is described later in detail.

When determination is made that the target vehicle has a malfunction, the malfunctioning part identifier 46 identifies a malfunctioning part by using the vehicle simulation model 36. The vehicle simulation model 36 is software that simulates the operation of the vehicle 10 on a computer. The vehicle simulation model 36 is stored in a storage medium (not illustrated). The vehicle simulation model 36 can simulate the operation of the vehicle 10 by being executed on hardware such as the server controller 34. The vehicle simulation model 36 and the malfunctioning part identifier 46 are described later in detail.

Figure 2A:
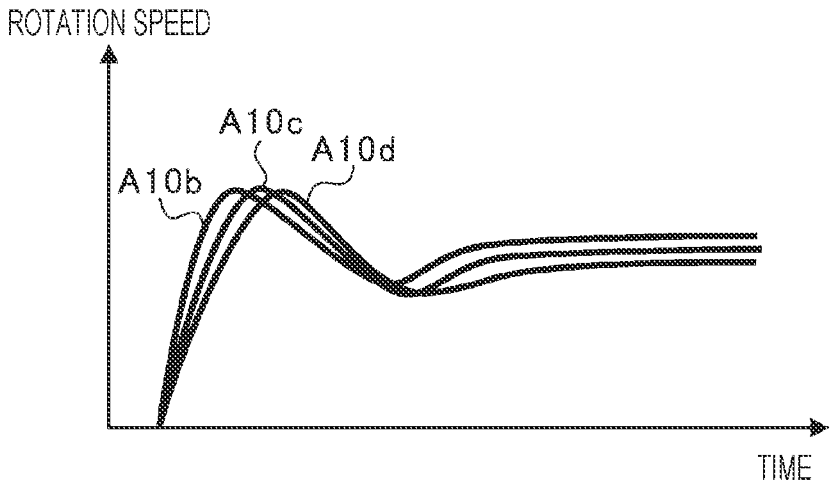
Figure 2B:
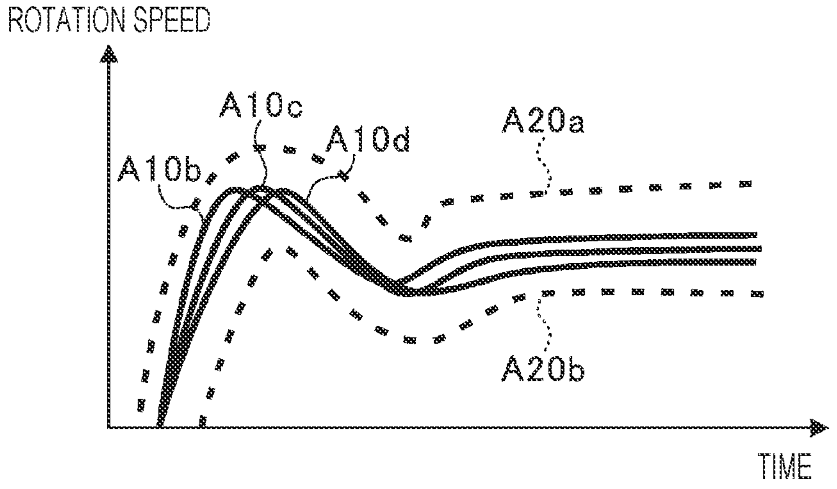
Figure 2C:
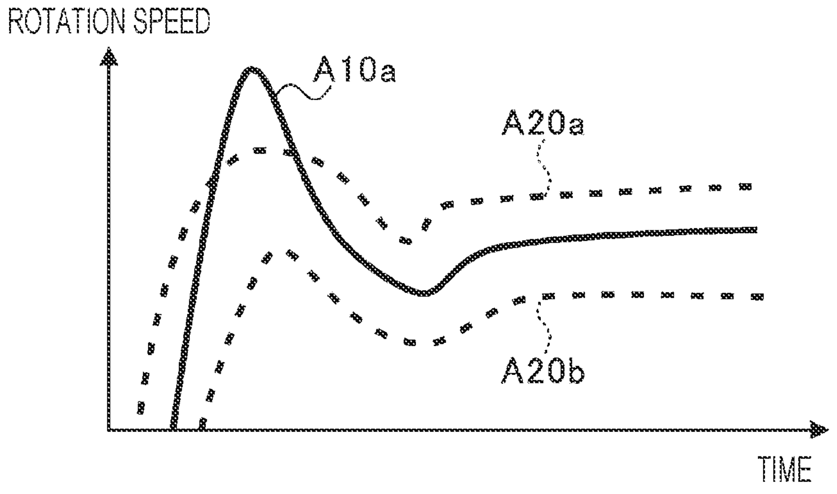

FIG. 2A to FIG. 2C are diagrams illustrating the appropriate range of the actual traveling result data and the determination as to whether the malfunction occurs. FIG. 2A illustrates an example of pieces of actual traveling result data of the other vehicles. In FIG. 2A, a solid line A10*b* represents actual traveling result data of the vehicle 10*b*, a solid line A10*c* represents actual traveling result data of the vehicle 10*c*, and a solid line A10*d* represents actual traveling result data of the vehicle 10*d*. FIG. 2B illustrates an example of the appropriate range. FIG. 2C illustrates an example of the actual traveling result data of the target vehicle. In FIG. 2A to FIG. 2C, temporal transitions of an engine speed at the start of the engine are illustrated as examples of the actual traveling result data.

The data acquirer 40 categorizes pieces of traveling environment data and actual traveling result data acquired from the vehicles 10 based on models of the vehicles 10, and sequentially accumulates the pieces of data in the data storage 32. The data acquirer 40 also categorizes the acquired pieces of traveling environment data and actual traveling result data based on situations, and sequentially accumulates the pieces of data in the data storage 32.

Examples of the situation include a situation where the engine is started, a situation where the vehicle is traveling at a constant low speed, and any other situation where a malfunction is likely to occur. For example, the situation is preset for the model of each vehicle 10 by an administrator of the management server 12. Each set situation is associated with a predetermined condition indicating a representative example of the traveling environment data. The predetermined condition serves as a determination reference for discriminating the traveling environment data based on each situation. When the acquired traveling environment data satisfies the predetermined condition, the data acquirer 40 categorizes the traveling environment data and the actual traveling result data in a predetermined temporal range into the situation associated with the predetermined condition.

FIG. 2A illustrates an example of pieces of actual traveling result data associated with pieces of traveling environment data in a case where the vehicle models are identical to that of the target vehicle and the engines are started. In FIG. 2A, the pieces of actual traveling result data at the start of the engines of the vehicles 10*b*, 10*c*, and 10*d* are illustrated in the same temporal range. As illustrated in FIG. 2A, the pieces of actual traveling result data of the plurality of vehicles 10 exhibit similar tendencies because the vehicle models and the pieces of traveling environment data are common.

The appropriate range setter 42 statistically processes the plurality of pieces of actual traveling result data with the common vehicle models and the common pieces of traveling environment data, thereby deriving the appropriate range of the actual traveling result data. The appropriate range setter 42 derives the appropriate range of the actual traveling result data for each vehicle model and each traveling environment data. In FIG. 2B, a broken line A20*a* represents an example of an upper limit value of the appropriate range, and a broken line A20*b* represents an example of a lower limit value of the appropriate range. The appropriate range is a range between the broken line A20*a* and the broken line A20*b*. For example, the appropriate range setter 42 may set the upper limit value of the appropriate range to a value obtained by adding 3σ to an average of the plurality of pieces of actual traveling result data, and set the lower limit value of the appropriate range to a value obtained by subtracting 3σ from the average. The symbol "σ" represents a standard deviation.

The upper limit value and the lower limit value of the appropriate range may be derived by any other method than the method that involves adding 3σ to and subtracting 3σ from the average. The appropriate range setter 42 may vary the appropriate range depending on either one of the vehicle model and the traveling environment data by changing 3σ to, for example, 2σ and 4σ.

As illustrated in FIG. 2C, the malfunction determiner 44 compares the actual traveling result data of the target vehicle exemplified by the solid line A10*a* and associated with the traveling environment data in a predetermined situation such as a situation where the engine is started and the appropriate range of the actual traveling result data that is based on the traveling environment data in the same situation. The malfunction determiner 44 determines that the target vehicle has no malfunction when the actual traveling result data of the target vehicle falls within the appropriate range. The malfunction determiner 44 determines that the target vehicle has a malfunction when at least a part of the actual traveling result data of the target vehicle in the predetermined temporal range associated with the situation falls out of the appropriate range. In the example of FIG. 2C, a part of the actual traveling result data of the target vehicle is higher than the upper limit value of the appropriate range. Therefore, the malfunction determiner 44 determines that the target vehicle has a malfunction.

Figure 3:
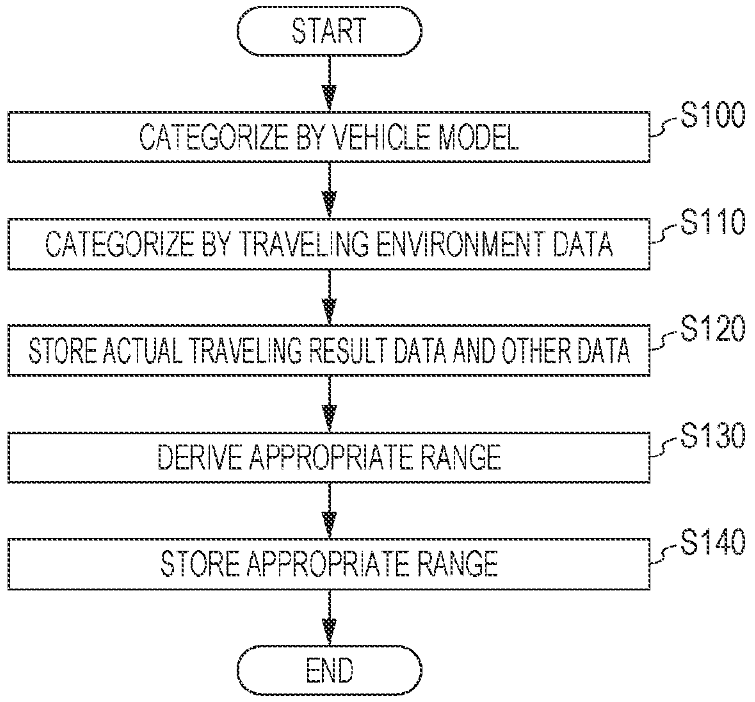
FIG. 3 is a flowchart illustrating a flow of processing of data received from vehicles.

FIG. 3 is a flowchart illustrating a flow of processing of data received from the vehicles 10. The data acquirer 40 executes a series of processes of FIG. 3 when traveling environment data and actual traveling result data are received from any vehicle 10.

The data acquirer 40 categorizes the received traveling environment data and the received actual traveling result data based on a vehicle model by referring to vehicle model data received together with the traveling environment data and the actual traveling result data (S100).

The data acquirer 40 categorizes the received traveling environment data and the received actual traveling result data based on traveling environment data in a predetermined situation (S110). For example, the data acquirer 40 categorizes the pieces of data by determining whether the traveling environment data satisfies a predetermined condition of each situation.

The data acquirer 40 stores the traveling environment data and the actual traveling result data in the data storage 32 in association with the vehicle model and the traveling environment data used for the categorization (S120).

The appropriate range setter 42 derives an appropriate range of the actual traveling result data associated with the vehicle model and the traveling environment data used for the categorization (S130). For example, the appropriate range setter 42 derives the appropriate range by reading and statistically processing a plurality of pieces of actual traveling result data associated with the vehicle model and the traveling environment data used for the categorization. The appropriate range setter 42 stores the derived appropriate range in the data storage 32 to update the appropriate range (S140).

Figure 4:
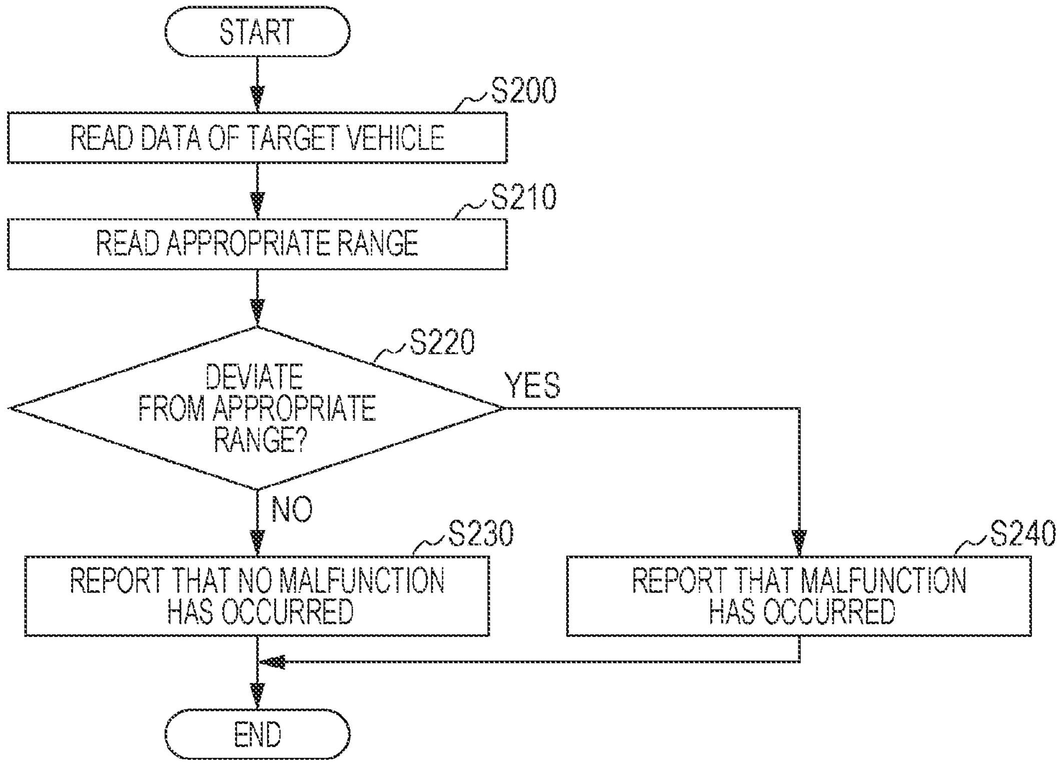
FIG. 4 is a flowchart illustrating a flow of operation of a malfunction determiner.

FIG. 4 is a flowchart illustrating a flow of operation of the malfunction determiner 44. For example, the administrator of the management server 12 sets the target vehicle to any vehicle 10 for which the administrator wants to make malfunction diagnosis, and instructs the server controller 34 to start the malfunction diagnosis. In response to the instruction to start the diagnosis, the malfunction determiner 44 executes a series of processes of FIG. 4.

The malfunction determiner 44 reads, from the data storage 32, actual traveling result data of the target vehicle associated with the traveling environment data in the predetermined situation (S200). The malfunction determiner 44 may execute subsequent processes by using actual traveling result data newly acquired from the target vehicle instead of reading the actual traveling result data from the data storage 32.

The malfunction determiner 44 reads, from the data storage 32, an appropriate range associated with the traveling environment data in the predetermined situation and with a vehicle model identical to that of the target vehicle (S210). The malfunction determiner 44 determines whether the actual traveling result data of the target vehicle falls within the appropriate range associated with the traveling environment data and the vehicle model identical to those of the target vehicle (S220).

When the actual traveling result data falls within, that is, does not deviate from the appropriate range ("NO" in S220), the malfunction determiner 44 determines that the target vehicle has no malfunction, and reports that no malfunction has occurred (S230). When the actual traveling result data deviates from the appropriate range ("YES" in S220), the malfunction determiner 44 determines that the target vehicle has a malfunction, and reports that the malfunction has occurred (S240). For example, the malfunction determiner 44 may cause a display (not illustrated) of the management server 12 to display information indicating whether the malfunction has occurred.

Figure 5:
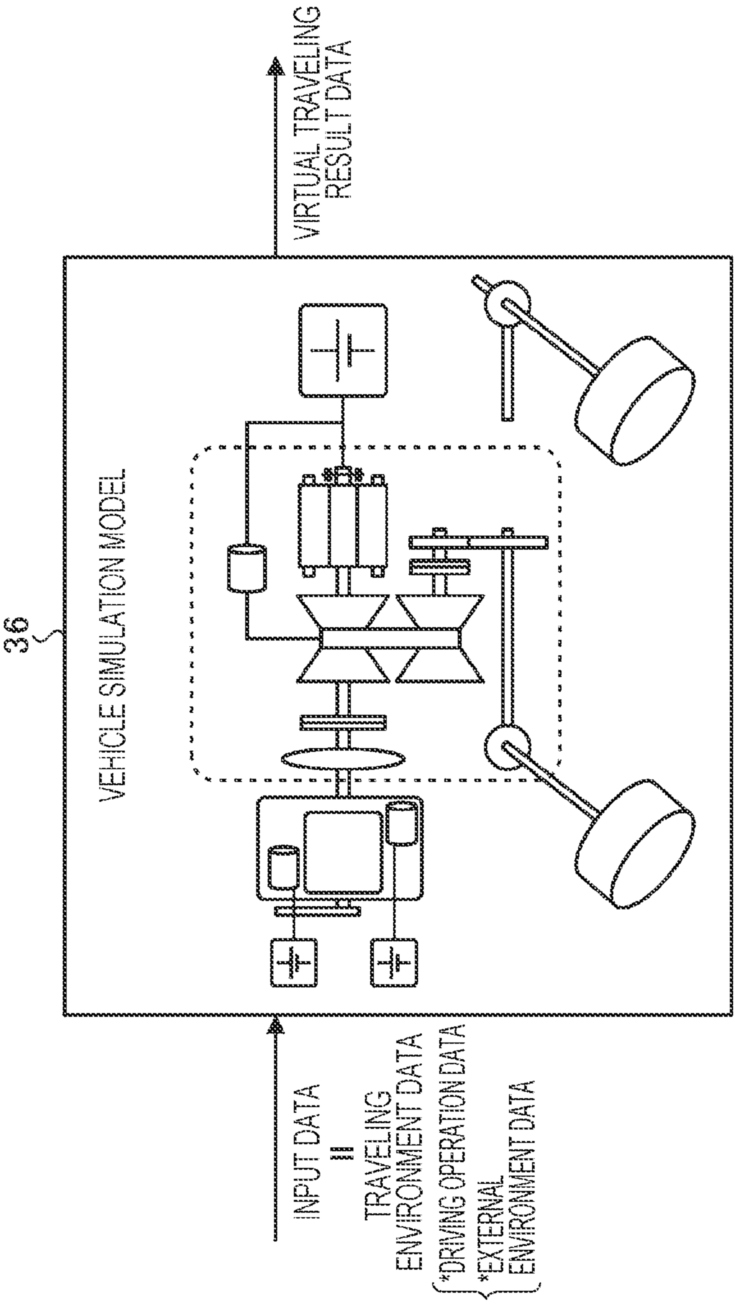
FIG. 5 is a diagram illustrating a vehicle simulation model.

FIG. 5 is a diagram illustrating the vehicle simulation model 36. Examples of the vehicle simulation model 36 include an engine model, a transmission model, a hybrid model, and any other model that simulates each function of the vehicle 10. The models that simulate the functions include either one or both of a control model and a plant model. The control model is software similar to a control program for use in an actual vehicle 10. The plant model is software that simulates a physical phenomenon and a mechanism such as operation of an actuator. The vehicle simulation model 36 may be created by machine learning using traveling environment data as input sample data and actual traveling result data as output sample data.

Traveling environment data of a vehicle 10 is input to the vehicle simulation model 36 as input data. As described above, the traveling environment data includes driving operation data indicating driving operations and external environment data indicating an external environment. When the traveling environment data is input, the vehicle simulation model 36 simulates the functions, and outputs virtual traveling result data indicating a virtual traveling result.

Various parameters are set in the vehicle simulation model 36. Each parameter is data to be used directly or indirectly in the process of deriving the virtual traveling result data from the traveling environment data. The parameter may be either one of a variable that changes depending on the traveling environment data and a constant unique to the vehicle 10. Examples of the parameter include a throttle opening degree, an engine ignition timing, a fuel injection amount, an EGR flow rate, and a clutch friction coefficient.

The parameter is associated with a specific part of the vehicle 10 based on a specific type of the parameter. The part of the vehicle 10 associated with the parameter may be referred to as "parameter-associated part". One type of parameter may be associated with a plurality of parameter-associated parts.

Examples of the parameter-associated part include a mechanism, a portion, a component, a member, a circuit, software, and any other element constituting the vehicle 10. For example, when the parameter is the clutch friction coefficient, the parameter-associated part is a clutch. For example, when the parameter is the engine ignition timing, the parameter-associated part is a spark plug.

Figure 6A:
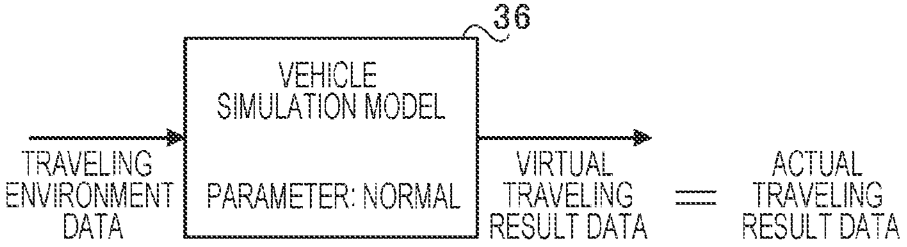
Figure 6B:
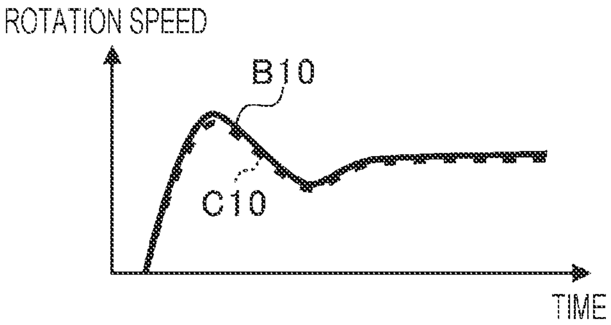
Figure 6C:
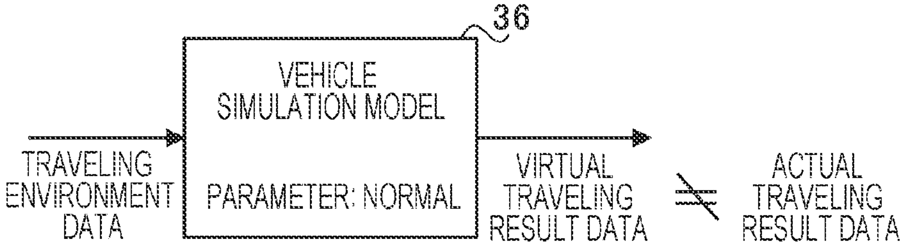
Figure 6D:
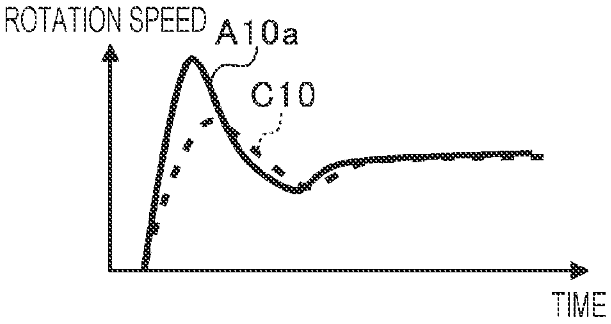

FIG. 6A to FIG. 6D are diagrams illustrating relationships between the vehicle simulation model 36 and a malfunction of a vehicle 10. FIG. 6A and FIG. 6B illustrate a relationship between actual traveling result data and virtual traveling result data when the target vehicle has no malfunction. FIG. 6C and FIG. 6D illustrate a relationship between the actual traveling result data and the virtual traveling result data when the target vehicle has a malfunction.

As illustrated in FIG. 6A, the vehicle simulation model 36 simulates a normal vehicle 10 having no malfunction. In this state, each parameter in the vehicle simulation model 36 is a normal value. Since the normal parameter is reflected in traveling environment data, the vehicle simulation model 36 outputs normal virtual traveling result data.

When the target vehicle has no malfunction, the actual traveling result data actually acquired from the target vehicle is expected to be a normal value. Therefore, the virtual traveling result data and the actual traveling result data agree with each other as illustrated in FIG. 6A when traveling environment data actually given to the target vehicle is identical to traveling environment data input to the vehicle simulation model.

For example, as illustrated in FIG. 6B, actual traveling result data of the normal target vehicle represented by a solid line B10 and virtual traveling result data represented by a broken line C10 agree with each other in relation to traveling environment data at the start of the engine.

The agreement between the virtual traveling result data and the actual traveling result data may include a difference within a predetermined range that can permit either one of variation of measurement in the actual vehicle 10 and variation of calculation in the vehicle simulation model 36.

In the vehicle simulation model 36 of FIG. 6C, each parameter is a normal value and normal virtual traveling result data is output similarly to the vehicle simulation model 36 of FIG. 6A. In FIG. 6C, however, the target vehicle has a malfunction. In this case, the actual traveling result data actually acquired from the target vehicle is expected to be different from the normal data. Therefore, the virtual traveling result data and the actual traveling result data do not agree with each other as illustrated in FIG. 6C though the traveling environment data actually given to the target vehicle is identical to the traveling environment data input to the vehicle simulation model 36.

For example, as illustrated in FIG. 6D, actual traveling result data of the malfunctioning target vehicle represented by a solid line A10*a* and the normal virtual traveling result data represented by the broken line C10 do not agree with each other in relation to the traveling environment data at the start of the engine.

If the virtual traveling result data can be made to agree with the actual traveling result data of the malfunctioning target vehicle, the vehicle simulation model 36 can simulate the malfunctioning target vehicle. As described later, a malfunctioning part of the malfunctioning target vehicle can be identified.

Figure 7A:
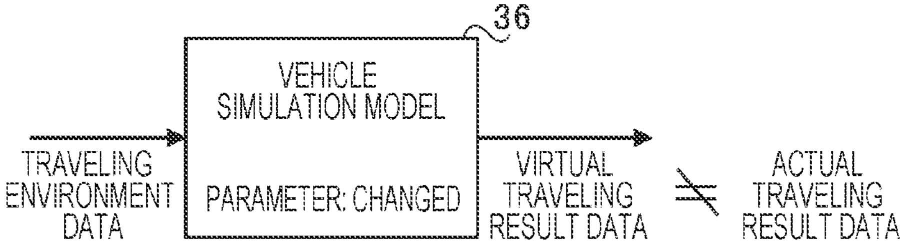
Figure 7B:
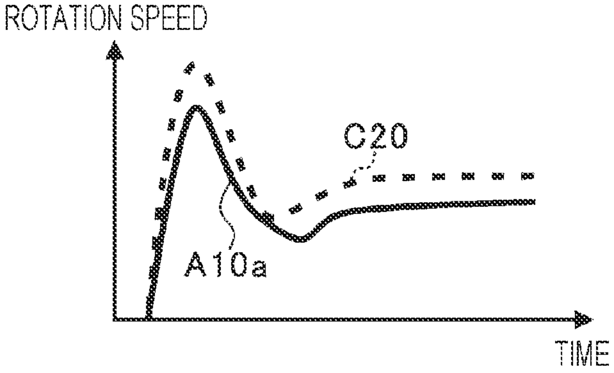
Figure 7C:
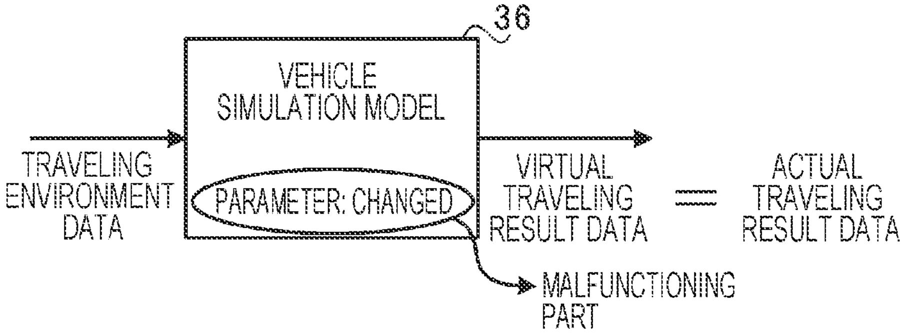
Figure 7D:
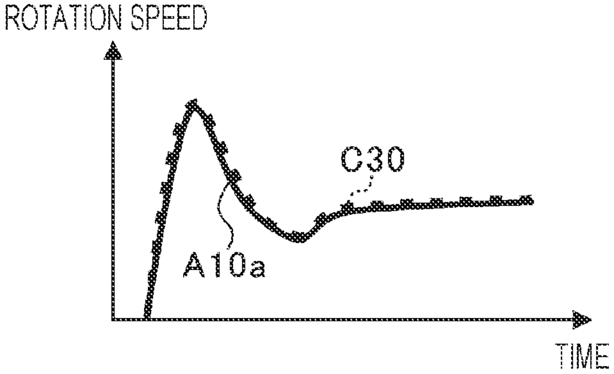

FIG. 7A to FIG. 7D are diagrams illustrating relationships between the vehicle simulation model 36 and identification of a malfunctioning part. FIG. 7A and FIG. 7B illustrate an example of a process of identifying the malfunctioning part. FIG. 7C and FIG. 7D illustrate an example in which the malfunctioning part is identified. In FIG. 7A to FIG. 7D, the traveling environment data input to the vehicle simulation model 36 is identical to the traveling environment data actually given to the malfunctioning target vehicle.

As illustrated in FIG. 7A, the malfunctioning part identifier 46 intentionally changes any parameter in the vehicle simulation model 36 from its normal value. The parameter change corresponds to simulation of an abnormal state of the vehicle 10 in the vehicle simulation model 36. The vehicle simulation model 36 outputs virtual traveling result data that reflects the changed parameter. The virtual traveling result data that reflects the changed parameter exhibits a value different from that of the normal virtual traveling result data.

The malfunctioning part identifier 46 determines whether the virtual traveling result data that reflects the changed parameter agrees with the actual traveling result data of the malfunctioning target vehicle. In FIG. 7B, a broken line C20 represents an example of the virtual traveling result data that reflects the change of any parameter. In FIG. 7B, any parameter is changed but the virtual traveling result data represented by the broken line C20 does not agree with the actual traveling result data represented by the solid line A10*a*.

As illustrated in FIG. 7C, the malfunctioning part identifier 46 further changes the parameter. The malfunctioning part identifier 46 may change any other parameter. Along with the further parameter change, the virtual traveling result data further changes. The malfunctioning part identifier 46 determines again whether the virtual traveling result data that reflects the changed parameter agrees with the actual traveling result data of the malfunctioning target vehicle.

As illustrated in FIG. 7C, the virtual traveling result data that reflects the changed parameter agrees with the actual traveling result data. For example, as illustrated in FIG. 7D, virtual traveling result data represented by a broken line C30 agrees with the actual traveling result data represented by the solid line A10*a*. In this case, the vehicle simulation model 36 is regarded as simulating the malfunctioning target vehicle. The changed parameter in the vehicle simulation model 36 corresponds to a parameter that has changed due to the malfunction.

The malfunctioning part identifier 46 repeatedly derives the virtual traveling result data by changing the parameter in the vehicle simulation model 36 until the virtual traveling result data agrees with the actual traveling result data of the target vehicle. The malfunctioning part identifier 46 identifies the malfunctioning part as a part related to the changed parameter in the vehicle simulation model 36 when the virtual traveling result data agrees with the actual traveling result data of the target vehicle.

For example, the agreement between the virtual traveling result data and the actual traveling result data may include a difference within a predetermined range that can permit either one of variation of measurement in the target vehicle and variation of calculation in the vehicle simulation model 36.

The malfunctioning part identifier 46 may determine that the virtual traveling result data and the actual traveling result data agree with each other when a transition of an absolute value of a value obtained by subtracting the actual traveling result data from the virtual traveling result data falls within a predetermined range. The malfunctioning part identifier 46 may also determine that the virtual traveling result data and the actual traveling result data agree with each other when a mean square value obtained by averaging, in a predetermined temporal range, squares of values obtained by subtracting the actual traveling result data from the virtual traveling result data is smaller than a predetermined value.

In the malfunction diagnosing system 1, many test cases are preset in the server controller 34. The test cases are set for expected malfunction modes. Each test case is associated with a type of a parameter to be changed in the vehicle simulation model 36 and a change amount of the parameter.

The malfunctioning part identifier 46 determines priority levels of the test cases based on actual traveling result data for which determination is made that a malfunction has occurred, and traveling environment data serving as a basis for the actual traveling result data. For example, the malfunctioning part identifier 46 schematically categorizes, based on the traveling environment data, the malfunction of the target vehicle as any one of major items including a malfunction in a drive system, a malfunction in a steering system, and a malfunction in an electrical system. For example, in a case of the traveling environment data at the start of the engine, the malfunctioning part identifier 46 categorizes the malfunction as the malfunction in the drive system.

Each major item is associated with a plurality of medium items. For example, the malfunction in the drive system is associated with a transmission malfunction, a gear shifting malfunction, and a torque fluctuation malfunction. The malfunctioning part identifier 46 analyzes the actual traveling result data for which determination is made that the malfunction has occurred, and categorizes the malfunction of the target vehicle as any one of the medium items.

For example, the malfunctioning part identifier 46 categorizes the malfunction as the transmission malfunction when the malfunctioning part identifier 46 estimates, in the actual traveling result data of the target vehicle, that rotation speeds of portions ranging from a power source to an axle have a mismatch. The malfunctioning part identifier 46 categorizes the malfunction as the gear shifting malfunction when the malfunctioning part identifier 46 estimates that the malfunction is not the transmission malfunction and rotation fluctuates in a preceding or succeeding stage of a gear shifting mechanism. The malfunctioning part identifier 46 categorizes the malfunction as the torque fluctuation malfunction when the malfunctioning part identifier 46 estimates that the malfunction is neither one of the transmission malfunction and the gear shifting malfunction.

Each medium item is associated with a plurality of minor items. For example, the torque fluctuation malfunction is associated with throttle, ignition, fuel, EGR, and variable valve timing. The malfunctioning part identifier 46 compares a change rate of a physical amount in the actual traveling result data of the target vehicle and rates of changes that may physically occur in the minor items. The malfunctioning part identifier 46 gives priority levels to the minor items in descending order of closeness of the change rates in the minor items to the change rate in the target vehicle.

For example, the change rate of the physical amount in the actual traveling result data of the target vehicle is a change rate of the rotation speed that is 3500 rpm/sec. A change rate of the rotation speed along with a change in a generated torque related to the throttle is 1000 rpm/sec. A change rate of the rotation speed related to the ignition is 4000 rpm/sec. A change rate of the rotation speed related to the fuel is 2500 rpm/sec. A change rate of the rotation speed related to the EGR is 2000 rpm/sec. A change rate of the rotation speed related to the variable valve timing is 1000 rpm/sec. In this example, the malfunctioning part identifier 46 determines the priority levels in order of the ignition, the fuel, the EGR, the variable valve timing, and the throttle.

The minor items are associated with the test cases. That is, the malfunctioning part identifier 46 gives the priority levels to the minor items to determine the priority levels of the test cases. In the example described above, the malfunctioning part identifier 46 gives the highest priority level to a test case related to the ignition.

The malfunctioning part identifier 46 executes the test cases in descending order of the priority levels. For example, the malfunctioning part identifier 46 changes, in the vehicle simulation model 36, a parameter indicated by a test case having a high priority level. For example, the malfunctioning part identifier 46 changes an ignition timing as a parameter indicated by the test case related to the ignition. Thus, the malfunctioning part identifier 46 can identify the malfunctioning part earlier than in a case of changing parameters randomly.

Figure 8:
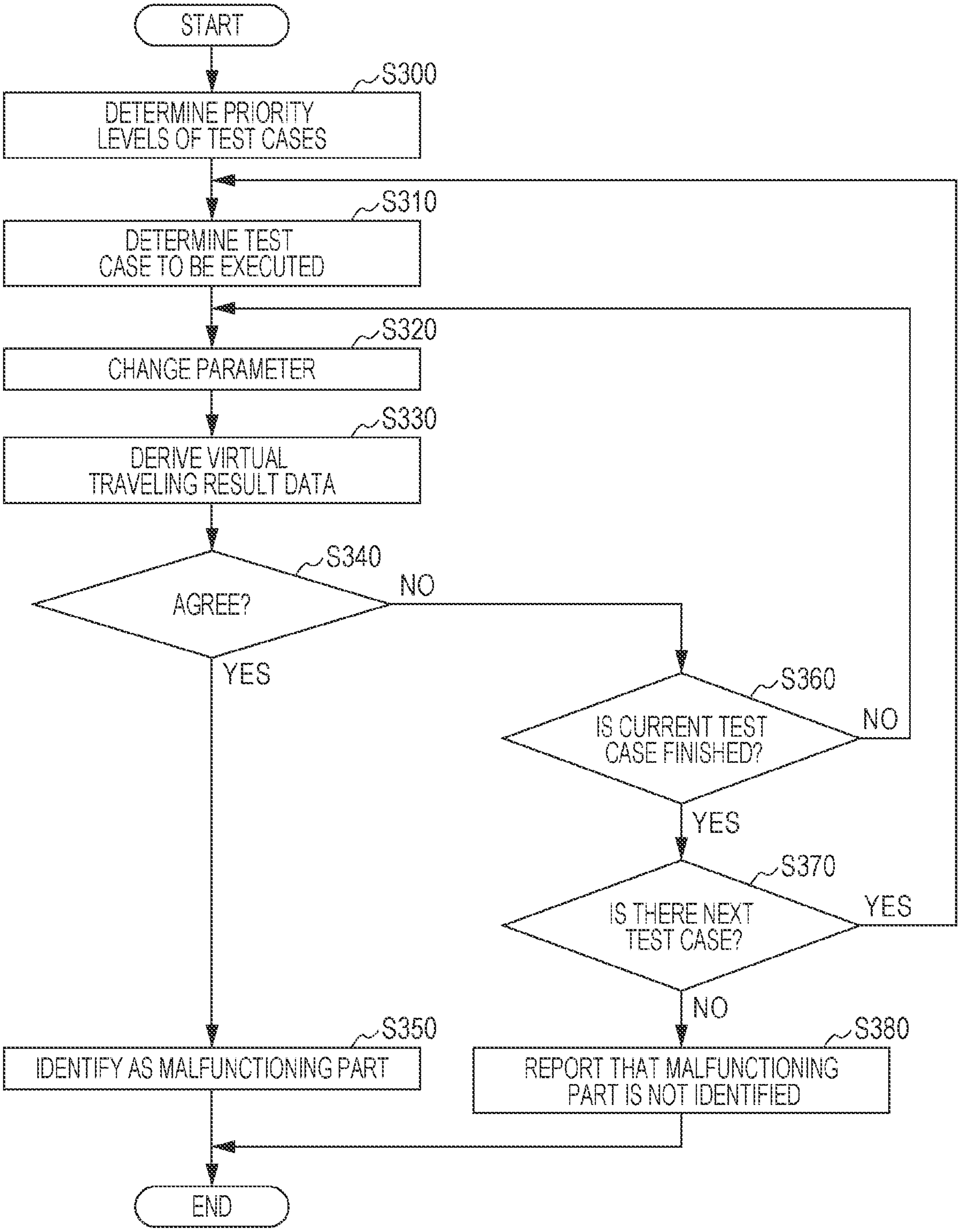
FIG. 8 is a flowchart illustrating a flow of operation of a malfunctioning part identifier.

FIG. 8 is a flowchart illustrating a flow of operation of the malfunctioning part identifier 46. The malfunctioning part identifier 46 executes a series of processes of FIG. 8 when the malfunction determiner 44 determines that the target vehicle has a malfunction.

The malfunctioning part identifier 46 determines priority levels of test cases based on actual traveling result data for which determination is made that a malfunction has occurred, and traveling environment data serving as a basis for the actual traveling result data (S300). The malfunctioning part identifier 46 determines a test case having the highest priority level as a test case to be executed (S310).

Among parameters in the vehicle simulation model 36, the malfunctioning part identifier 46 changes a parameter associated with the test case determined in Step S310 (S320).

The malfunctioning part identifier 46 derives virtual traveling result data by inputting traveling environment data of the target vehicle to the vehicle simulation model 36 where the parameter is changed in Step S320 (S330). The malfunctioning part identifier 46 determines whether the actual traveling result data of the target vehicle agrees with the derived virtual traveling result data (S340).

When the actual traveling result data of the target vehicle agrees with the virtual traveling result data ("YES" in S340), the malfunctioning part identifier 46 identifies a malfunctioning part as a part associated with the parameter changed in Step S320 (S350), and terminates the series of processes.

When the actual traveling result data of the target vehicle does not agree with the virtual traveling result data ("NO" in S340), the malfunctioning part identifier 46 determines whether the current test case is finished (S360). When the current test case is not finished ("NO" in S360), the malfunctioning part identifier 46 returns to Step S320 to further change the parameter (S320).

When the current test case is finished ("YES" in S360), the malfunctioning part identifier 46 determines whether there is a next test case (S370). When there is a next test case ("YES" in S370), the malfunctioning part identifier 46 returns to the process of Step S310 to determine a test case having the second highest priority level as the test case to be executed (S310).

When there is no next test case ("NO" in S370), the malfunctioning part identifier 46 reports that the malfunctioning part is not identified (S380), and terminates the series of processes.

As described above, the appropriate range setter 42 of the malfunction diagnosing system 1 according to this embodiment derives the appropriate range of actual traveling results based on the traveling environment data among the vehicles whose models are identical to that of the target vehicle. The malfunction determiner 44 determines whether the target vehicle has a malfunction by determining whether the actual traveling result data of the target vehicle falls within the appropriate range. The malfunction diagnosing system 1 of this embodiment does not determine that a malfunction has occurred when the actual traveling result data of the target vehicle falls within the appropriate range. Therefore, erroneous diagnosis of malfunctions can be suppressed though the vehicles 10 have manufacturing variations.

Thus, the malfunction diagnosing system 1 of this embodiment has an improved accuracy of diagnosis of malfunctions of the vehicles 10.

When determination is made that the target vehicle has a malfunction, the malfunctioning part identifier 46 of the malfunction diagnosing system 1 of this embodiment repeatedly derives the virtual traveling result data while changing the parameter in the vehicle simulation model. The malfunctioning part identifier 46 identifies the malfunctioning part as a part related to the changed parameter in the vehicle simulation model when the virtual traveling result data agrees with the actual traveling result data.

Since the malfunction diagnosing system 1 of this embodiment can identify the malfunctioning part as well as the determination as to whether the malfunction has occurred, the accuracy of the malfunction diagnosis can further be improved.

The appropriate range setter 42 of this embodiment sequentially derives the appropriate ranges at timings when the traveling environment data and the actual traveling result data are acquired from any vehicle 10. The appropriate range setter 42 may derive the appropriate range at a timing when an instruction to start the malfunction diagnosis is received, instead of deriving the appropriate range at the timing when the traveling environment data and the actual traveling result data are acquired.

The appropriate range setter 42 of this embodiment derives the appropriate range associated with the vehicle model and the traveling environment data for all the vehicles 10 including the target vehicle. Since the population for the derivation of the appropriate range is large, the appropriate range can accurately be derived though the actual traveling result data of the target vehicle is reflected in the derivation of the appropriate range. When the target vehicle is known in advance, the appropriate range setter 42 may derive the appropriate range associated with the vehicle model and the traveling environment data for vehicles other than the target vehicle.

Although the embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

The server controller 34 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the server controller 34 including the data acquirer 40, the appropriate range setter 42, the malfunction determiner 44, and the malfunctioning part identifier 46. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A malfunction diagnosing system comprising:

one or more processors, and one or more machine readable tangible mediums storing instructions to cause the one or more processors to execute a first processing, and a vehicle simulation model configured to simulate an operation of a vehicle using parameters, wherein the first processing includes:

acquiring target vehicle traveling environment data and target vehicle actual traveling result data in association with each other for the target vehicle, the target vehicle traveling environment data comprising at least driving operation data indicating a driving operation of the target vehicle, the target vehicle actual traveling result data indicating an actual traveling result based on the target vehicle traveling environment data;

deriving an appropriate range of actual traveling results based on traveling environment data for vehicles of identical model that are identical to a model of the target vehicle;

determining whether the target vehicle has a malfunction by determining whether the target vehicle actual traveling result data falls within the appropriate range; and executing a second processing based on determining that the target vehicle has the malfunction;

wherein the second processing includes:

deriving first virtual traveling result data indicating a first virtual traveling result using (i) the vehicle simulation model in which one or more first values of one or more first parameters are changed among values of the parameters, and (ii) the changed one or more first values;

deriving, based on determining that the first virtual traveling result data does not agree with the target vehicle actual traveling result data, second virtual traveling result data indicating a second virtual traveling result using (i) the vehicle simulation model in which one or more second values of one or more second parameters different from the one or more first parameters are changed among the values of the parameters, and (ii) the changed one or more second values;

identifying, based on determining that the first virtual traveling result data agrees with the target vehicle actual traveling result data, one or more first parts of the target vehicle as a malfunctioning part; and identifying, based on determining that the second virtual traveling result data agrees with the target vehicle actual traveling result data, one or more second parts different from the one or more first parts of the target vehicle as the malfunctioning part, wherein the target vehicle actual traveling result data includes data that indicates a rotation speed of a wheel of the target vehicle, a speed of the target vehicle, an acceleration of the target vehicle, an engine speed of the target vehicle or temporal transitions of the engine speed, and that is acquired using a target vehicle sensor equipped in the target vehicle, wherein the parameters include at least two vehicle parameters, each vehicle parameter indicating one of a throttle opening degree of the vehicle, an engine ignition timing of the vehicle, a fuel injection amount of the vehicle, an exhaust gas recirculation (EGR) flow rate of the vehicle, or a clutch friction coefficient of the vehicle, and wherein the one or more first parameters are associated with the one or more first parts, and the one or more second parameters are associated with the one or more second parts.

2. The malfunction diagnosing system according to claim 1, wherein the target vehicle actual traveling result data includes data that indicates the engine speed of the target vehicle or the temporal transitions of the engine speed, and wherein the second processing further includes determining the one or more first parameters and the one or more second parameters based on a change rate of a physical amount in the target vehicle actual traveling result data.

3. The malfunction diagnosing system according to claim 1, wherein the first processing further includes causing a display to display information indicating whether the target vehicle has the malfunction.

4. The malfunction diagnosing system according to claim 1, wherein the second processing further includes providing a report indicating that the malfunctioning parts are not identified.

5. A malfunction diagnosing system comprising circuitry storing instructions to execute a first processing, and a vehicle simulation model configured to simulate an operation of a vehicle using parameters, wherein the first processing includes:

acquiring target vehicle traveling environment data and target vehicle actual traveling result data in association with each other for the target vehicle, the target vehicle traveling environment data comprising at least driving operation data indicating a driving operation of the target vehicle, the target vehicle actual traveling result data indicating an actual traveling result based on the target vehicle traveling environment data;

deriving an appropriate range of actual traveling results based on traveling environment data for vehicles of identical model that are identical to a model of the target vehicle;

determining whether the target vehicle has a malfunction by determining whether the target vehicle actual traveling result data falls within the appropriate range; and executing a second processing based on determining that the target vehicle has the malfunction, wherein the second processing includes:

deriving first virtual traveling result data indicating a first virtual traveling result using (i) the vehicle simulation model in which one or more first values of one or more first parameters are changed among values of the parameters, and (ii) the changed one or more first values;

deriving, based on determining that the first virtual traveling result data does not agree with the target vehicle actual traveling result data, second virtual traveling result data indicating a second virtual traveling result using (i) the vehicle simulation model in which one or more second values of one or more second parameters different from the one or more first parameters are changed among the values of the parameters, and (ii) the changed one or more second values;

identifying, based on determining that the first virtual traveling result data agrees with the target vehicle actual traveling result data, one or more first parts of the target vehicle as a malfunctioning part; and identifying, based on determining that the second virtual traveling result data agrees with the target vehicle actual traveling result data, one or more second parts different from the one or more first parts of the target vehicle as the malfunctioning part, wherein the target vehicle actual traveling result data includes data that indicates a rotation speed of a wheel of the target vehicle, a speed of the target vehicle, an acceleration of the target vehicle, an engine speed of the target vehicle or temporal transitions of the engine speed, and that is acquired using a target vehicle sensor equipped in the target vehicle, wherein the parameters include at least two vehicle parameters, each vehicle parameter indicating one of a throttle opening degree of the vehicle, an engine ignition timing of the vehicle, a fuel injection amount of the vehicle, an exhaust gas recirculation (EGR) flow rate of the vehicle, or a clutch friction coefficient of the vehicle, and wherein the one or more first parameters are associated with the one or more first parts, and the one or more second parameters are associated with the one or more second parts.

6. The malfunction diagnosing system according to claim 5, wherein the target vehicle actual traveling result data includes data that indicates the engine speed of the target vehicle or the temporal transitions of the engine speed, and wherein the second processing further includes determining the one or more first parameters and the one or more second parameters based on a change rate of a physical amount in the target vehicle actual traveling result data.

7. The malfunction diagnosing system according to claim 5, wherein the first processing further includes causing a display to display information indicating whether the target vehicle has the malfunction.

8. The malfunction diagnosing system according to claim 5, wherein the second processing further includes providing a report indicating that the malfunctioning parts are not identified.

* * * * *